Jan. 17, 1950     C. F. WOLTERS     2,495,046
TRUCK FOR RECORD TRAYS
Filed April 8, 1947     4 Sheets-Sheet 1
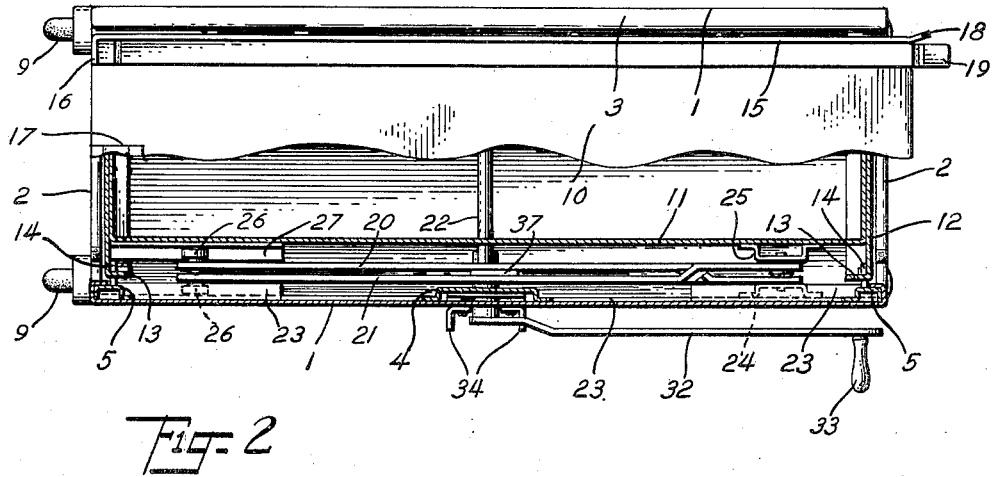
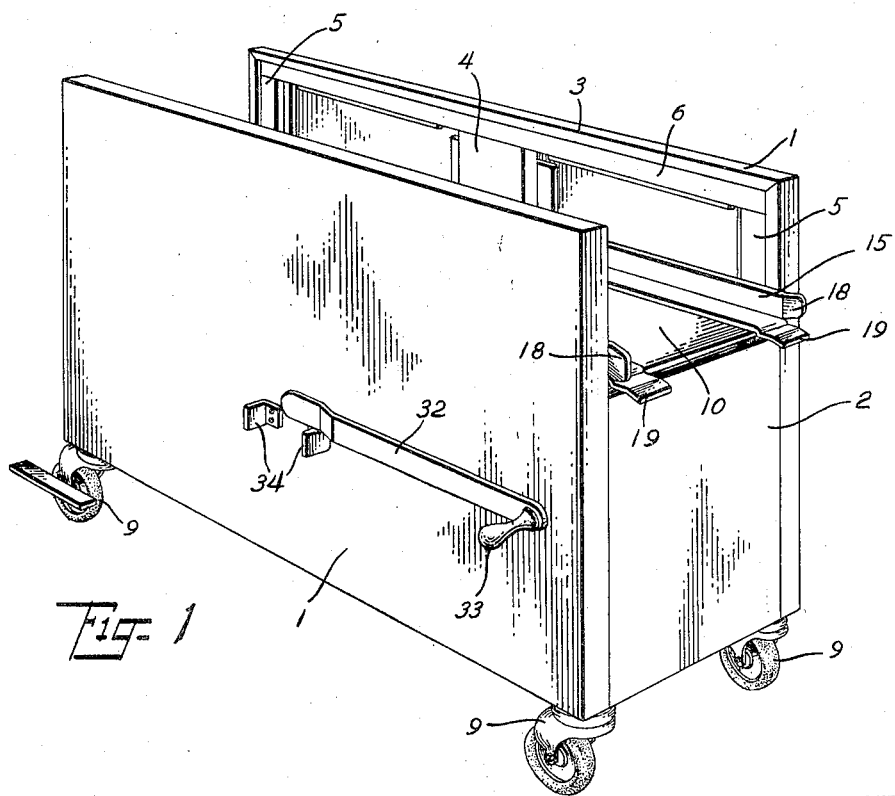
INVENTOR
Carl F. Wolters
ATTORNEY Jan. 17, 1950   C. F. WOLTERS   2,495,046
TRUCK FOR RECORD TRAYS
Filed April 8, 1947   4 Sheets-Sheet 2

INVENTOR
Carl F. Wolters
BY
ATTORNEY

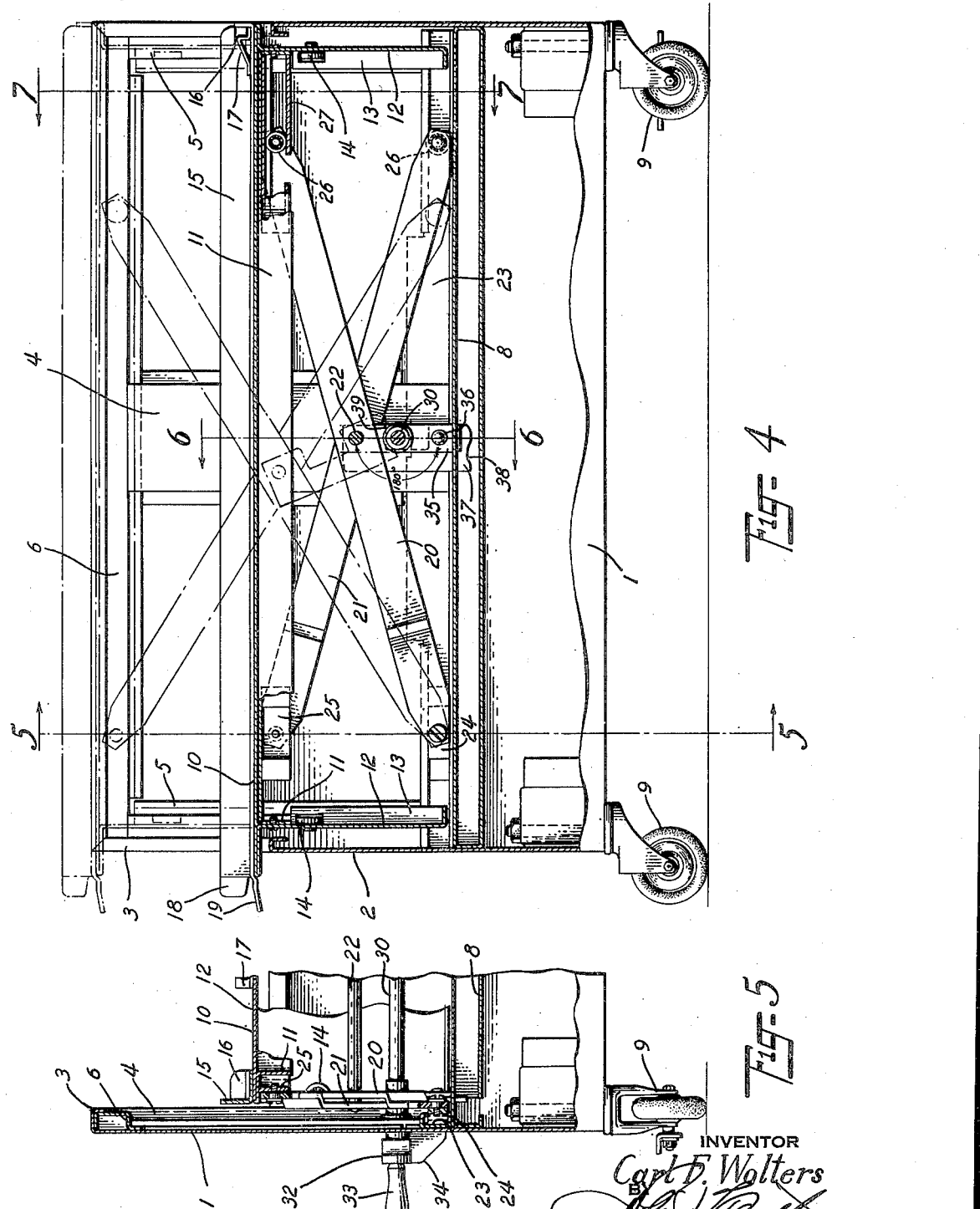

Jan. 17, 1950  C. F. WOLTERS  2,495,046
TRUCK FOR RECORD TRAYS
Filed April 8, 1947  4 Sheets-Sheet 4
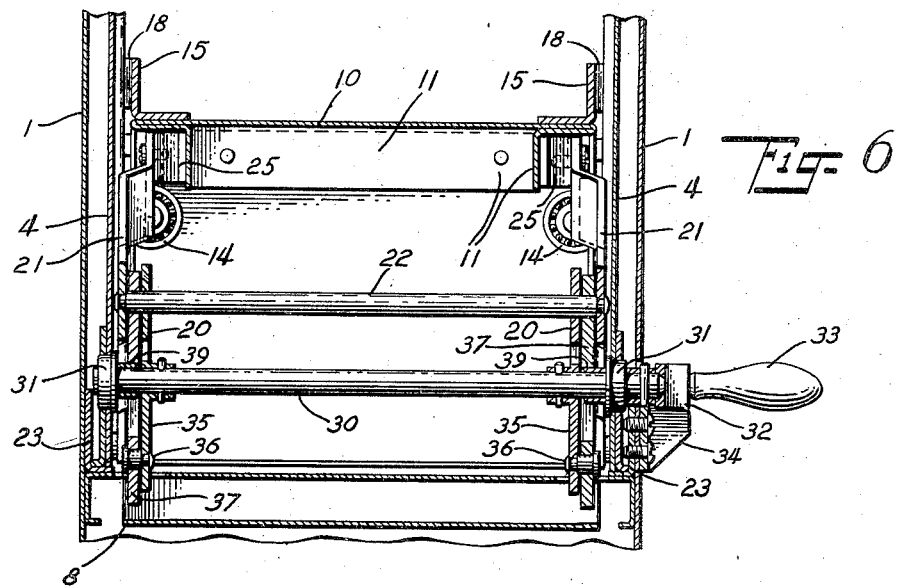
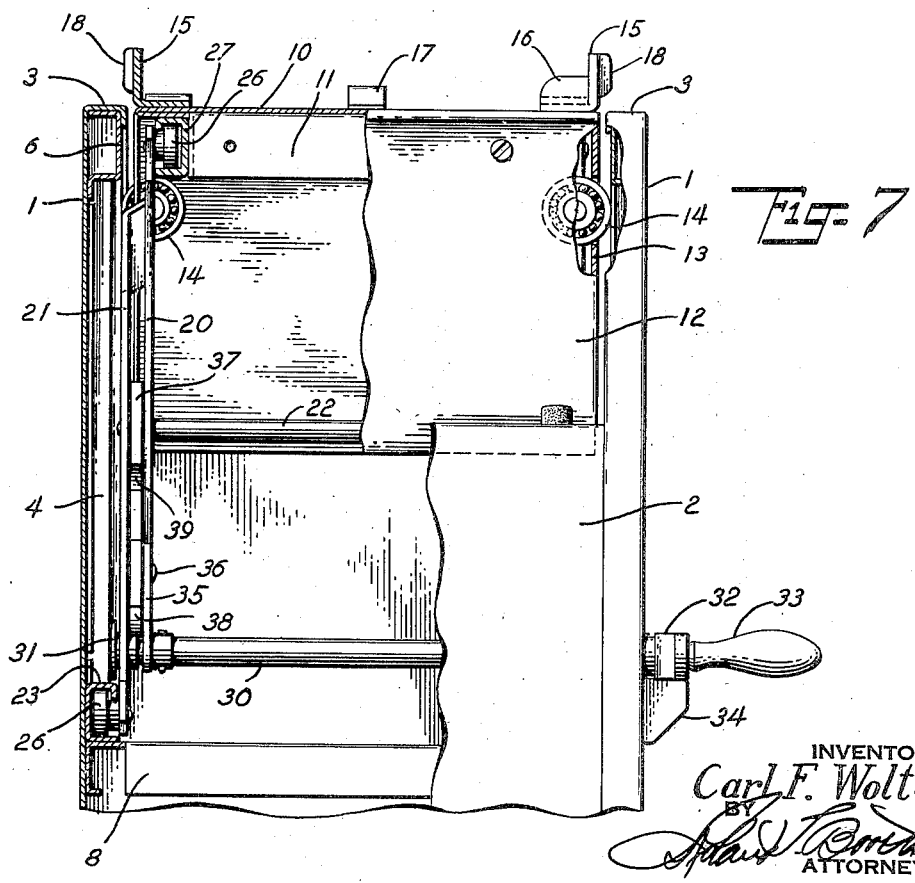
INVENTOR
Carl F. Wolters
ATTORNEY Patented Jan. 17, 1950

2,495,046

UNITED STATES PATENT OFFICE 2,495,046

TRUCK FOR RECORD TRAYS

Carl F. Wolters, New Canaan, Conn., assignor to Remington Rand Inc., Buffalo, N. Y., a corporation of Delaware Application April 8, 1947, Serial No. 740,256

7 Claims. (Cl. 187—9)

This invention relates to a truck constructed to support card index trays for transportation from one point to another in an office.

The invention provides a truck for carrying a card index tray on a platform movable into upper or lower positions for the convenient use of an operator and for transporting the tray between a filing cabinet in which it may be housed and one or more desks or other similar locations for use. This truck facilitates the operation of card index systems, particularly the handling of charge accounts in department stores and the like, in providing for the support of a tray at two different levels and its ready transportation about an office together with the provision of a platform having track members for conveniently moving the tray to or from the platform.

The truck provided by this invention has the platform mounted in a frame for movement into upper and lower positions through the convenient manual operation of a handle on one side of the truck while suitable means is provided for rigidly supporting the platform with the tray thereon in either the upper or lower position. Suitable means in the form of a lazy-tong mechanism is provided for holding the platform in a horizontal position in its movement into the upper and lower positions. The lazy-tong mechanism also provides part of the elevating mechanism for the platform while a pivoted link formed with a shoulder on one end and a second shoulder intermediate the ends in a cut-out portion in one side, is arranged to cooperate with the shaft structure of the operating mechanism so that one of the two shoulders will engage over the operating shaft and rigidly seat thereon adjacent the frame structure and rigidly support the platform in either the upper or lower position. A rotatable operating shaft is provided with radially extending arms pivotally connected to the free ends of the supporting link and a handle on one end of the shaft outside of the frame structure provides for manual operation by the handle of the arms, supporting links and lazy-tong mechanism to raise and lower the platform. The operating link structure and the radial arms on the operating shaft are constructed so that the link structure is moved to engage the shoulders with a portion of the operating shaft structure in providing for the rigid support of the platform in both the upper and lower positions. Suitable guide means, such as rollers and tracks, is mounted on the platform and frame structure respectively, for cooperation to guide the platform in its vertical movement in the frame.

In the drawings:

Fig. 1 shows the truck constructed according to the present invention in perspective, with the platform in the lower position.

Fig. 2 is a plan view of the truck having portions of the platform and one side of the truck broken away and shown in cross-section to illustrate details of construction.

Fig. 4 is a vertical longitudinal cross-section with the platform shown in the lower position in full lines and in the upper position in dot and dash lines.

Fig. 5 is a fragmentary cross-section taken on line 5—5 of Fig. 4.

Figure 3:
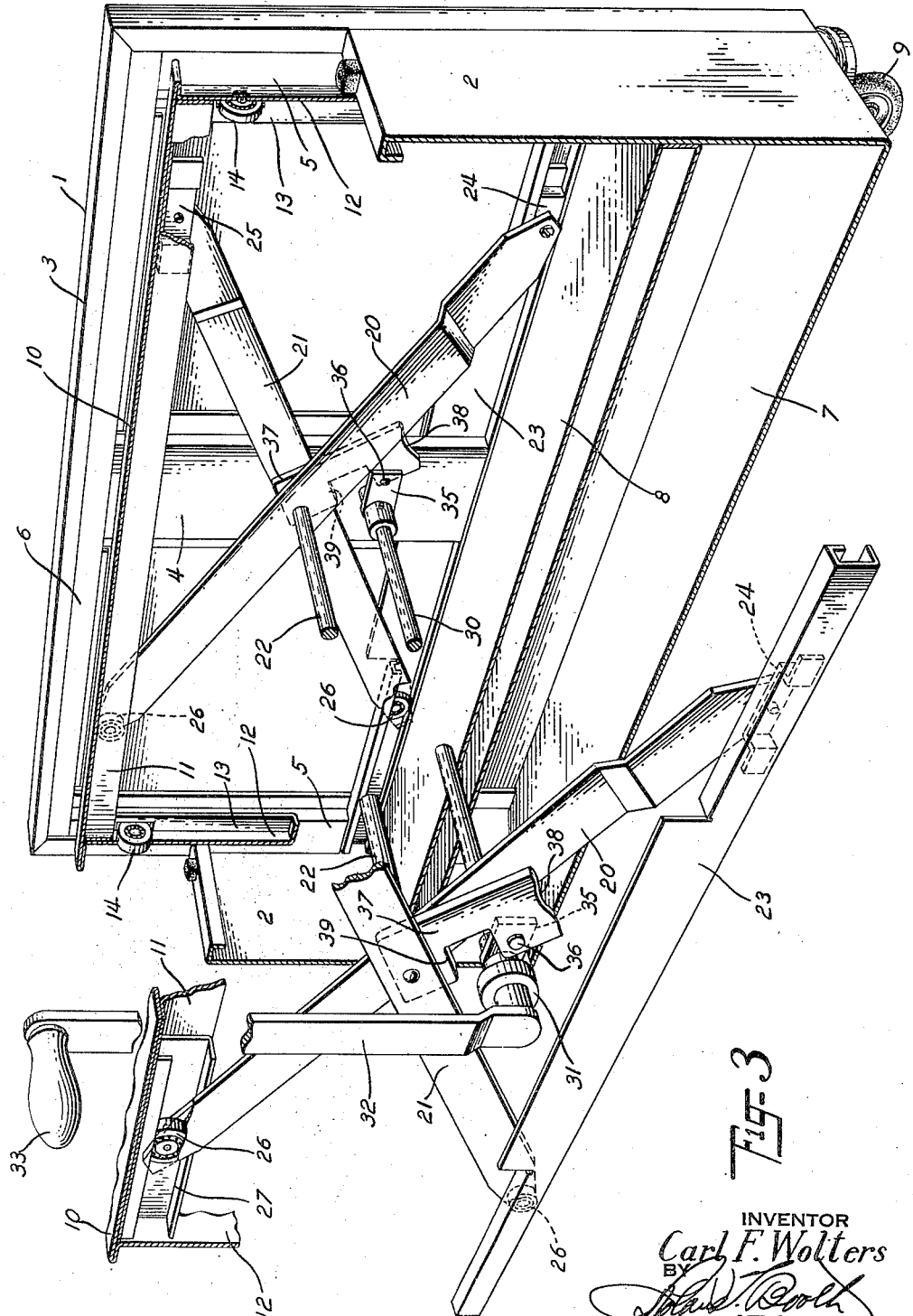
Fig. 3 is an enlarged fragmentary perspective having the outer casing portions broken away at the side from which the truck is viewed, so that the platform operating and guiding mechanism can be clearly illustrated.

Figs. 6 and 7 are transverse cross-sections taken on lines 6—6 and 7—7 respectively, of Fig. 4.

The truck of this invention has a rigid sheet metal casing and frame structure that may be fabricated and assembled economically. The truck has a frame structure formed with sides 1 and ends 2. Sides 1 have a piece of sheet metal of rectangular shape formed with inturned flanges on all four sides terminating in lips extending inwardly parallel to the sides in spaced relation thereto as indicated at 3. These inturned edges and lips at 3 about the margin of the sheet forming each side 1 provide a channel structure extending entirely around the front and upper edges while at the bottom, the sheet forming each side has only a laterally extending marginal portion. A center channel member 4 is mounted in vertically extending relation in the center on the inner side of each side 1 and has marginal flanges spot welded or otherwise suitably secured to the inner face of the rectangular piece forming side 1.

End channel members 5 are mounted in vertically extending relation, engaged in the inturned edge and lip structure 3 at each end of each side 1 and suitably spot welded or otherwise secured to the inner face of sides 1, as clearly shown in Figs. 2 and 3, to provide a rigid front and rear end structure for each side 1. A top channel member 6 is secured under the inturned edge and lip structure 3 on the inner side of each side member 1, as clearly shown in Figs. 1 and 3. Top channel member 6 is suitably spot welded or otherwise secured to the inner face of the piece of sheet metal forming the major portion of side member 1. This provides a composite side structure formed of sheet metal that has considerable strength and rigidity.

An elongated strip of sheet metal is formed to provide a bottom 7 and upwardly extending portions forming ends 2. At the upper edge the strip is turned inwardly and downwardly to form the upper edge of each end 2. The upper edges of ends 2 terminate in spaced relation below the upper edges of sides 1 in order to provide an opening on opposite ends of the truck so ready access may be provided to a tray carried in the truck in the lower position hereinafter described. The side margins of the strip of sheet metal forming bottom 7 and ends 2 are suitably welded to the marginal portions of sides 1. The frame has an inner bottom 8 formed of sheet metal extending between the side and end walls in spaced parallel relation above bottom 7 and located in the lower portion of the truck. Inner bottom 8 has the side margins extended downwardly to engage the inner faces of the side and end walls to which the inner bottom is rigidly secured by spot welding, or the like. The truck is mounted on suitable casters 9 secured at the corners to the bottom, sides and ends.

End channel members 5 provide vertically extending tracks at the front and rear edges of each side wall for guiding platform 10 in its vertical movement.

Platform 10 is formed of sheet metal and has angle portions 11 secured to the sides and ends on the under side to provide a rigid structure. An apron 12 is mounted on each end of platform 10 and suitably attached to the under side thereof inside and adjacent end walls 2 to form an enclosure for the opening under platform 10 in the upper position. Each apron 12 has laterally extending side flanges 13 for providing a rigid apron structure. The upper ends of side flanges 13 at the sides of the apron, are formed with openings through which guide rollers 14 project to engage the inner faces of end channel members 5 for guiding platform 10 in its vertical movement in the truck frame. Guide rollers 14 are mounted on apron 12.

Platform 10 carries a pair of angle tracks 15 mounted on the upper side edges thereof and extending from end to end to provide trackways for receiving the guide rollers on a card index tray of the character shown in applicant's co-pending application Serial No. 740,255 filed under even date herewith. At the forward end, tracks 15 are provided with laterally extending stop flanges 16. A retaining latch 17 is secured to the upper front end of platform 10 for retaining a tray in attached position on the platform against shifting movement. The rear ends of angle tracks 15 have the vertical flanges thereon formed with wings 18 and the lower flanges formed with guide projections 19 operating in a manner clearly disclosed in applicant's co-pending application.

Means is provided for insuring horizontal movement of platform 10 between the upper and lower position. For this purpose, a lazy-tong mechanism is used in the manner shown in the drawings in which two pairs of levers are employed. Levers 20 and 21 provide one pair of levers. Each pair of levers 20 and 21 are arranged at one side of the track, as clearly shown in Fig. 3. Levers 20 and 21 are pivotally connected together at the central portion by means of pivot rod 22. A lever carrying channel bracket 23 is secured to the inner face of each side member 1 against the upper face of inner bottom 8. A U-shaped pivot bracket 24 is secured to the right-hand end portion of bracket 23, as shown in Fig 3 to provide the pivotal mounting for the lower rear end of lever 20. A similar pivot bracket 25 is secured to flange 11 along one side of platform 10 immediately above bracket 24 and on the under side of platform 10 to provide the pivotal mounting for one end of lever 21 to the rear end of platform 10. Levers 20 and 21 extend in diagonal relation adjacent sides 1 and carry ball bearing rollers 26 on the opposite ends. Lever 21 extends forwardly and downwardly with bearing roller 26 on the lower front end engaging in the channel portion at the front end of channel bracket 23 for rolling engagement thereon. Bearing roller 26 on the upper forward end of lever 20 engages in channel bracket 27 secured on the under side of platform 10 against flange 11. As platform 10 moves vertically between its upper and lower positions, levers 20 and 21 pivot about rod 22 and insure horizontal movement of platform 10 in all positions.

The operating mechanism for raising and lowering platform 10 and supporting it in either the upper or lower position, includes an operating shaft 30 mounted in suitable bearings 31 carried by center channel members 4. One end of operating shaft 30 extends through sides 1 at one side of the truck and carries an operating lever 32 having a handle 33 on the free end thereof. Angle brackets 34 are secured on the side 1 adjacent operating lever 32 in position to limit the movement of operating lever 32 to 180° from a horizontal position extending to the right, as shown in Fig. 1 to a horizontal position extending to the left, as shown in Fig. 1. When these positions are reached, operating lever 32 will engage one of the brackets 34. Operating shaft 30 is provided with radially extending operating arms 35 adjacent center channel members 4, each having the free ends pivotally connected at 36 to one end of a supporting link 37 having the opposite end pivotally connected on pivot rod 22 between levers 20 and 21. Two supporting links 37 are used. Each supporting link 37 is formed to provide a shoulder at the free end as indicated at 38. A cut-out portion in the side of each supporting link 37 forms a shoulder at 39 and enables supporting link 37 to engage about operating shaft 30 in the lower position of the platform. Shoulders 38 and 39 engage above shaft 30 in supporting the platform in the upper and lower positions. Shoulders 38 and 39 are formed to engage over the top portion of an inwardly extending sleeve formed as part of bearings 31 mounted in center channel members 4. These shoulders will rest on these extensions of bearing members 31 and provide a rigid support for the platform in both the upper and lower positions.

When operating lever 32 extends to the rear of the truck as shown in Fig. 1, platform 10 will be supported in the lower position. This position of the operating shaft, supporting links 37 and lazy-tong mechanism, is clearly shown in Fig. 4. Operating arms 35 will extend directly downward and shoulders 39 of links 37 will engage the upper portion of bearings 31 so that the weight on platform 10 is transmitted to supporting links 37 by levers 20 and 21 and pivot rod 22. A rigid support for the platform is provided adjacent opposite sides of the truck close to center channel members 4.

When it is desired to elevate platform 10 to the dot and dash line position shown in Fig. 4, handle 33 is manually operated to move operating lever 32 from the position shown in Fig. 1, in a counter-clockwise direction as shown in Fig. 1, to a forwardly extending horizontal position. This will secure the rotation of operating shaft 30 to move operating arms 35 in a clockwise direction, as shown in Fig. 4. This movement of operating arms 35 will move supporting links 37 from the full to the dot and dash line position shown in Fig. 4 for engaging shoulders 38 on links 37 with bearings 31. In this movement of supporting links 37, lazy-tong levers 20 and 21 will be moved from the full to the dot and dash line position shown in Fig. 4 to elevate platform 10 to its upper position. Platform 10 will be guided in its upward movement by rollers 14 engaging the inner faces of end channel members 5 forming the tracks for guiding platform 10.

This truck provides a support for card index trays so that they may be used for reference in a standing position when platform 10 is in its upper position. When platform 10 is in its lower position, the card index tray supported thereon will be in a position for convenient reference and operation by a person occupying a sitting position.

The invention claimed is:

1. A truck for record trays, comprising a frame having sides and ends, vertical guides at opposite sides on each end of said frame, a horizontal platform vertically movable on said guides, means connected to said platform and frame holding said platform in horizontal relation in movement into upper and lower positions on said frame, a shaft rotatable in said frame, an operating arm on said shaft, a supporting link connected at opposite ends to said operating arm and said means respectively, said link having a pair of shoulders thereon for alternately engaging a frame carried part for supporting said platform in said upper and lower positions, and said shaft being operable to move said operating arm, link and said means for elevating and lowering said platform into said upper and lower positions.

2. A truck for record trays, comprising a frame having sides and ends, vertical guides at opposite sides on each end of said frame, a horizontal platform vertically movable on said guides, means connected to said platform and frame holding said platform in horizontal relation in movement into upper and lower positions on said frame, a shaft rotatable in said frame, an operating arm mounted on and projecting radially from said shaft, a supporting link pivoted at opposite ends to the free end of said operating arm and means respectively, said link being formed to provide a shoulder intermediate its end and another shoulder at the end connected to said operating arm, said shoulders being alternately engageable with a part of said frame carrying said shaft, a manually operable lever on said shaft at one side of said truck operable to rotate said shaft and move said operating arm to selectively engage one of said shoulders with said part of said frame for supporting said platform in either upper or lower positions.

3. A truck for record trays, comprising a frame having sides and ends, a horizontal platform vertically movable on said frame, a lazy-tong mechanism for securing uniform movement of said platform relative to said frame into upper and lower positions, a supporting link pivoted on said lazy-tong mechanism and formed with a pair of shoulders for alternately engaging a part on said frame, and manually operated means for moving said link and lazy-tong mechanism to raise and lower said platform into said upper and lower positions and engage one of said shoulders on said link with the part on said frame whereby said platform is rigidly supported in each position.

4. A truck for record trays, comprising a frame having sides and ends, a horizontal platform vertically movable on said frame, a lazy-tong mechanism for securing uniform movement of said platform relative to said frame into upper and lower positions, a supporting link pivoted on said lazy-tong mechanism and formed with a pair of shoulders, aligned shaft mounting bearing means carried by said frame at opposite sides thereof, a shaft rotatable in said bearing means, an operating arm mounted on and extending radially from said shaft having the free end pivotally connected to the free end of said link, and means for rotating said shaft to raise and lower said platform through movement of said link and lazy-tong mechanism and move one of the shoulders on said link to engage over at least one of said shaft bearing means for rigidly supporting said platform in both positions.

5. A truck for record trays, comprising a frame having sides and ends, a horizontal platform vertically movable on said frame, a lazy-tong mechanism having two pairs of pivoted levers connected by a pivot rod for securing uniform movement of said platform relative to said frame into upper and lower positions, a pair of supporting links pivoted at one end on said pivot rod adjacent opposite ends thereof, aligned shaft mounting bearing means carried by said frame at opposite sides thereof, a shaft rotatably mounted in said bearing means, a pair of operating arms extending radially from said shaft pivotally connected each to the free end of one of said links, and a manually operable handle on said shaft at the outside of said truck for rotating said shaft and raising and lowering said platform through said links and lazy-tong mechanism, and a pair of spaced shoulders formed on said links for engagement and support over said shaft bearing means to rigidly support said platform in both positions.

6. A truck for record trays comprising a frame including sheet metal sides and ends, the latter terminating below the upper edges of the sides to define at the top of said frame space open at each end for the reception of a record tray, spaced parallel guide rails at opposite ends of said frame, a platform vertically movable between an upper position in which it is substantially level with the upper edges of said sides and a lower position in which the platform rests upon the upper edges of the ends, said platform being guided in its movement between and by said guide rails for supporting a tray between said sides, platform moving means connected between said platform and said frame for moving said platform in parallel relation in movement between said upper and lower positions and lever operative means connected with said platform moving means operable to move and support said platform in said upper and lower positions, whereby a tray may be supported on said platform at the two different levels in the lower of which it is laterally enclosed by the upper portions of said sides.

7. Means as set forth in claim 6 in which the frame includes in addition a base primarily constituted by a sheet metal member providing a mounting for wheel means for supporting said frame on a floor surface, the sheet metal of said frame cooperating with said platform to provide a structure externally enclosing the platform moving means.

CARL F. WOLTERS.

REFERENCES CITED

The following references are of record in the file of this patent:

UNITED STATES PATENTS

| Number | Name | Date |
|---|---|---|
| 623,699 | Hooper et al. | Apr. 25, 1899 |
| 691,542 | Godard | Jan. 21, 1902 |